United States Patent
Mochida et al.

(10) Patent No.: US 10,720,805 B2
(45) Date of Patent: Jul. 21, 2020

(54) EMBEDDED PERMANENT MAGNET TYPE ROTATING ELECTRIC MACHINE WITH PERMANENT MAGNET ROTOR HAVING MAGNET HOLES AND CENTRAL BRIDGE

(71) Applicant: FUJI ELECTRIC CO., LTD., Kawasaki-shi (JP)

(72) Inventors: Toshiharu Mochida, Fujimi (JP); Akio Toba, Hino (JP); Hideki Ohguchi, Hino (JP); Hiroshi Shimada, Hino (JP); Takeyuki Kobayashi, Yokohama (JP)

(73) Assignee: FUJI ELECTRIC CO., LTD., Kawasaki-Shi (JP)

( * ) Notice: Subject to any disclaimer, the term of this patent is extended or adjusted under 35 U.S.C. 154(b) by 0 days.

(21) Appl. No.: 14/733,466

(22) Filed: Jun. 8, 2015

(65) Prior Publication Data
US 2015/0270749 A1  Sep. 24, 2015

Related U.S. Application Data

(63) Continuation of application No. PCT/JP2014/050302, filed on Jan. 10, 2014.

(30) Foreign Application Priority Data

Feb. 8, 2013 (JP) ................. 2013-022837

(51) Int. Cl.
*H02K 27/00* (2006.01)
*H02K 1/27* (2006.01)
(Continued)

(52) U.S. Cl.
CPC ............. *H02K 1/276* (2013.01); *H02K 1/28* (2013.01); *H02K 29/03* (2013.01)

(58) Field of Classification Search
CPC ........ H02K 1/28; H02K 1/2766; H02K 1/276; H02K 29/03; H02K 1/27; H02K 2213/03
(Continued)

(56) References Cited

U.S. PATENT DOCUMENTS 4,327,302 A  4/1982 Hershberger
4,476,736 A  10/1984 Hershberger
(Continued)

FOREIGN PATENT DOCUMENTS

CN  101188369 A  5/2008
CN  101213719 A  7/2008
(Continued)

OTHER PUBLICATIONS

Japanese Office Action issued in Japanese counterpart application No. JP2014-560695, dated Nov. 24, 2015. English translation provided.
(Continued)

*Primary Examiner* — Maged M Almawri
(74) *Attorney, Agent, or Firm* — Rossi, Kimms & McDowell LLP

(57) ABSTRACT

An embedded permanent magnet type motor, which has one pole configured of two permanent magnets and has a plurality of poles of permanent magnets embedded in a rotor, includes a rotor whose magnet embedding holes communicate with a rotor outer periphery. The rotor has between adjacent poles a q-axis projection projecting in a direction away from a rotor rotation center. The magnet embedding holes are disposed so as to form an inverted V shape. An outer peripheral edge portion on the outer side of the permanent magnets has a curvature radius smaller than the distance from a rotation center axis to a rotor outermost peripheral portion. The outer peripheral edge portion is provided with permanent magnet positioning projections
(Continued)

which restrain a movement of the permanent magnets toward between adjacent poles.

9 Claims, 3 Drawing Sheets

(51) Int. Cl.
*H02K 1/28* (2006.01)
*H02K 29/03* (2006.01)

(58) Field of Classification Search
USPC .......... 310/156.56, 156.53, 156.83, 156.12
See application file for complete search history.

(56) References Cited

U.S. PATENT DOCUMENTS

| | | | | |
|---|---|---|---|---|
| 5,811,904 | A * | 9/1998 | Tajima | H02K 1/276 310/156.45 |
| 6,208,054 | B1 * | 3/2001 | Tajima | H02K 29/03 310/156.53 |
| 6,486,581 | B2 * | 11/2002 | Miyashita | H02K 1/276 310/156.01 |
| 6,847,144 | B1 * | 1/2005 | Luo | H02K 1/276 310/156.49 |
| 7,262,526 | B2 * | 8/2007 | Shiga | H02K 1/2786 310/156.28 |
| 7,847,456 | B2 * | 12/2010 | Kori | H02K 1/276 310/156.01 |
| 7,994,666 | B2 | 8/2011 | Kori et al. | |
| 8,350,434 | B2 * | 1/2013 | Hori | H02K 1/276 310/156.53 |
| 8,766,503 | B2 | 7/2014 | Kagami et al. | |
| 9,502,932 | B2 * | 11/2016 | Date | H02K 1/276 |
| 2004/0256940 | A1 | 12/2004 | Tsuruta | |
| 2006/0103253 | A1 * | 5/2006 | Shiga | H02K 1/2786 310/156.45 |
| 2006/0113858 | A1 | 6/2006 | Hino et al. | |
| 2007/0126304 | A1 * | 6/2007 | Ito | H02K 1/2766 310/156.53 |
| 2008/0129129 | A1 | 6/2008 | Kori | |
| 2009/0009114 | A1 | 1/2009 | Schunk | |
| 2010/0194221 | A1 * | 8/2010 | Kori | H02K 1/276 310/61 |
| 2012/0248915 | A1 * | 10/2012 | Kagami | H02K 1/2766 310/156.01 |
| 2013/0106234 | A1 | 5/2013 | Kagami | |
| 2013/0119812 | A1 * | 5/2013 | Takizawa | H02K 1/276 310/156.53 |
| 2014/0091663 | A1 | 4/2014 | Hazeyama | |
| 2014/0145538 | A1 | 5/2014 | Date | |
| 2014/0210293 | A1 | 7/2014 | Kagami | |
| 2015/0194850 | A1 * | 7/2015 | Muniz Casais | H02K 1/2766 290/55 |
| 2016/0072348 | A1 | 3/2016 | Mochida et al. | |
| 2017/0063211 | A1 | 3/2017 | Mochida | |

FOREIGN PATENT DOCUMENTS

| | | |
|---|---|---|
| CN | 102710040 A | 10/2012 |
| CN | 103518313 A | 1/2014 |
| EP | 1662634 A2 | 5/2006 |
| EP | 2562913 A2 | 2/2013 |
| EP | 2587634 A2 | 5/2013 |
| EP | 3054563 A1 | 8/2016 |
| JP | 2004320989 A | 11/2004 |
| JP | 2008131813 A | 6/2008 |
| JP | 2010081754 A | 4/2010 |
| JP | 2011004480 A | 1/2011 |
| JP | 2012080718 A | 4/2012 |
| JP | 2012205472 A | 10/2012 |
| JP | 2012228101 A | 11/2012 |
| JP | 2013099047 A | 5/2013 |

OTHER PUBLICATIONS

International Search Report issued in PCT/JP2014/050302, dated Apr. 15, 2014. English translation provided.
Office Action issued in Chinese Appln. No. 201480003440.0, dated Sep. 29, 2016. Partial English translation provided.
Extended European Search Report issued in European Appln. No. 14749437.1, dated Oct. 14, 2016.
Office Action issued in Chinese Appln. No. 201480003440.0 dated May 3, 2017. English translation provided.
International Search Report issued in Intl. Appln. No. PCT/JP2015/059408 dated Jun. 16, 2015. English translation provided.
Office Action issued in U.S. Appl. No. 15/347,392 dated Sep. 22, 2017.
Extended European Search Report issued in European Appln. No. 15793247.6 dated Mar. 6, 2018.
Office Action issued in Chinese Appln. No. 201580024409.X dated Apr. 26, 2018. English translation provided.
Office Action issued in U.S. Appl. No. 15/347,392 dated Jul. 19, 2018.
Office Action issued in U.S. Appl. No. 15/347,392 dated Jan. 28, 2019.
Office Action issued in U.S. Appl. No. 15/347,392 dated Jun. 21, 2019.
Office Action issued in U.S. Appl. No. 15/347,392 dated Oct. 16, 2019.

* cited by examiner

EMBEDDED PERMANENT MAGNET TYPE ROTATING ELECTRIC MACHINE WITH PERMANENT MAGNET ROTOR HAVING MAGNET HOLES AND CENTRAL BRIDGE

CROSS-REFERENCE TO RELATED APPLICATIONS

This application is a continuation of International Application No. PCT/JP2014/050302, filed on Jan. 10, 2014, which is based on and claims priority to Japanese Patent Application No. JP 2013-022837, filed on Feb. 8, 2013. The disclosure of the Japanese priority application and the PCT application in their entirety, including the drawings, claims, and the specification thereof, are incorporated herein by reference.

BACKGROUND

1. Field of the Invention

The present invention relates to a rotating electric machine having a rotor, such as a motor or a generator, and particularly, to an embedded permanent magnet type rotating electric machine having permanent magnets embedded in the rotor.

2. Related Art

FIGS. 4A and 4B are sectional views showing configurations of a rotor of an IPM motor which is one example of a heretofore known embedded permanent magnet type rotating electric machine, and FIG. 4C is a diagram showing an outer peripheral surface of the rotor. The IPM motor of the heretofore known example is disclosed in Japanese Patent Application Publication No. JP-A-2011-4480. The IPM motor is such that two permanent magnets 13a and 13b disposed in a V shape so as to expand toward the outer side of a rotor 10 form one pole, and that a plurality of sets of the two permanent magnets 13a and 13b are embedded in the rotor 10, thus forming a plurality of poles. Also, the rotor 10 is configured by alternately stacking stacked steel plates 11 shown in FIG. 4A and stacked steel plates 12 shown in FIG. 4B, a stacked steel plate of one kind on a stacked steel plate of another, as shown in FIG. 4C, or several stacked steel plates of one kind on several stacked steel plates of another.

As shown in FIG. 4A, two holding hole portions 18a and 18b, two cavity portions 14a and 14b, and two cavity portions 15a and 15b are formed as one pole in the stacked steel plate 11, and a plurality of sets of the portions are formed. Specifically, the two holding hole portions 18a and 18b, disposed in a V shape, which hold the two permanent magnets 13a and 13b, the two cavity portions 14a and 14b, disposed in a portion (the central portion of the V) between the two holding hole portions 18a and 18b, which communicate respectively with the holding hole portions 18a and 18b, and the two cavity portions 15a and 15b, each disposed in a portion (each end portion of the V) between the cavity portion and another adjacent pole, are formed as one pole.

The holding hole portion 18a, the cavity portion 14a, and the cavity portion 15a form one continuous region (hole), while the holding hole portion 18b, the cavity portion 14b, and the cavity portion 15b also form one continuous region (hole), and each region only has to be punched as one hole when punching the stacked steel plate 11. By the punching, side bridges 19a and 19b are formed on the outer edge sides of the cavity portions 15a and 15b.

Also, as shown in FIG. 4B, two holding hole portions 18a' and 18b', two cavity portions 14a' and 14b', and two notch portions 16a and 16b are formed as one pole in the stacked steel plate 12, and a plurality of sets of the portions are formed. The holding hole portion 18a' and 18b' and cavity portions 14a' and 14b' in the stacked steel plate 12 are the same respectively as the holding hole portions 18a and 18b and cavity portions 14a and 14b in the stacked steel plate 11. Specifically, the two holding hole portions 18a' and 18b', disposed in a V shape, which hold the two permanent magnets 13a and 13b, the two cavity portions 14a' and 14b', disposed in a portion (the central portion of the V) between the two holding hole portions 18a' and 18b', which communicate respectively with the holding hole portions 18a' and 18b', and the two notch portions 16a and 16b, disposed so as to be superimposed respectively on the cavity portions 15a and 15b, which communicate respectively with the holding hole portions 18a' and 18b' and open into the outer edge of the stacked steel plate 12, are formed as one pole. The notch portions 16a and 16b are disposed so as to include therein the respective cavity portions 15a and 15b, and thereby disposed so as to be superimposed on the respective cavity portions 15a and 15b.

The holding hole portion 18a', the cavity portion 14a', and the notch portion 16a form one continuous region (notch), while the holding hole portion 18b', the cavity portion 14b', and the notch portion 16b also form one continuous region (notch), and each region only has to be punched as one notch when punching the stacked steel plate 12.

A center bridge 19c exists between the cavity portion 14a and cavity portion 14b in the stacked steel plate 11 and between the cavity portion 14a' and cavity portion 14b' in the stacked steel plate 12. In each stacked steel plate 11 and 12, a region on the inner peripheral side of the permanent magnets and a region on the outer peripheral side connect together via the center bridge 19c.

Further, when the stacked steel plates 11 and 12 are alternately stacked one on another, the outer peripheral surface of the rotor 10 is of the appearance shown in FIG. 4C, and the notches 16a and 16b, forming their respective rows, are disposed every other stacked steel plate.

In the heretofore known example, the stacked steel plates 11 and the stacked steel plates 12 are alternately stacked, and in the stacked steel plates 12, magnetic fluxes pass through the notch portions 16a and 16b, meaning that in the stacked steel plates 11, it is possible to reduce magnetic short circuit without reducing the width of the side bridges 19a and 19b. Specifically, as each stacked steel plate 12 has the notch portions 16a and 16b, the total sectional area wherein the sectional areas of cores, each of which is between the permanent magnets and rotor outer peripheral surface in each steel plate, are summed up (that is, the total sectional area wherein the sectional areas of the side bridges 19a and 19b portions are summed up) becomes ½, as a result of which magnetic short circuit is reduced.

Also, in the stacked steel plate 12, as each notch portion 16a and 16b is formed in a portion between itself and another adjacent pole, and no core exists, the magnetic resistance in the notch portions 16a and 16b can be made larger than the magnetic resistance in the side bridges 19a and 19b. Further, as the stacked steel plates 11 and the stacked steel plates 12 are alternately stacked, it is possible to make the magnetic resistance larger than in the case of using only the stacked steel plates 11. Consequently, by reducing magnetic short circuit in the notch portions 16a and 16b, it is possible to suppress a magnetic flux leakage and supply many magnetic fluxes to the stator side, and thus possible to improve motor efficiency. Furthermore, in the stacked steel plate 12, as the core exists in a portion through which d-axis magnetic fluxes and q-axis magnetic fluxes pass, it is possible to maintain a desired reluctance torque.

With the heretofore described configuration, even when it is necessary to form the side bridges 19a and 19b to a predetermined width for punching quality and centrifugal force resistance, it is possible, owing to the existence of the notch portions 16a and 16b, to increase magnetic resistance and suppress a magnetic flux leakage while securing a predetermined width as the width of the side bridges 19a and 19b.

However, in the heretofore known embedded permanent magnet type rotating electric machine heretofore described, as the rotor is configured of a plurality of kinds of rotor steel materials differing in shape, there are the following kinds of problems. First, there is the problem that a plurality of kinds of punch dies for manufacturing the rotor steel materials are needed when manufacturing the rotor, thus leading to a cumbersome and complicated management of members and dies. Also, the rotor steel materials differing in shape are different in strength characteristics from one another. In spite of this, in the heretofore known embedded permanent magnet type rotating electric machine, the shape and layout of magnets and shafts need to be identical between the plurality of kinds of rotor steel materials. Therefore, the range of design of the shape and layout of magnets and shafts is considerably narrowed. As a result of this, there is no other choice than to reduce the size of magnets and the thickness of shafts, and therefore, the rotation speed or torque of the rotating electric machine is greatly restricted. Also, when configuring the rotor by stacking a plurality of kinds of rotor steel materials differing in shape, three-dimensional magnetic field computation and strength calculation are needed when designing the rotor, and there is the problem that a computation load increases and computation accuracy decreases. Also, the plurality of kinds of rotor steel materials differing in shape cannot be formed from a solid steel material by removal processing such as wire cutting. Therefore, there is the problem of an increase in processing cost.

Also, in the heretofore known embedded permanent magnet type rotating electric machine, as the side bridges 19a and 19b exist in one of two kinds of steel plates configuring the rotor, there are the following problems. Firstly, due to the existence of the side bridges 19a and 19b, not a few leakage magnetic fluxes of the permanent magnets still remain, and the magnetic resistance is also far from zero. This prevents the torque generated in the rotor from increasing. Also, in the heretofore known embedded permanent magnet type rotating electric machine, as the side bridges 19a and 19b exist in the rotor, the rotor is ill-ventilated in a rotor axial direction. The ill-ventilation of the rotor is a factor in preventing the cooling of the rotor, especially, the permanent magnets in the rotor. Also, as the side bridges 19a and 19b exist in the rotor, there is the problem that the force of supporting the permanent magnets against a centrifugal force becomes uneven, thus generating a large stress inside the permanent magnets.

Also, in general, an embedded permanent magnet type rotating electric machine is such that circumferential assembly residual stress remains in the rotor steel material when fitting and fixing the rotor steel material on the shaft. The range in which the assembly residual stress remains mainly is a radial range in which no hole or notch exists on a circumference centered on the rotor axis (that is, the range of a ring-shaped connection). In the case of the heretofore known example, as the side bridges 19a and 19b exist, there is a ring-shaped region on the outermost periphery of the rotor, and tensile residual stress remains in the ring-shaped region on the outermost periphery. Also, shear stress resulting from a centrifugal force is applied to the side bridges 19a and 19b when the rotor rotates. Consequently, in order to prevent the side bridges 19a and 19b from damaging when the rotor rotates, it is necessary to increase the width of the side bridges 19a and 19b. Therefore, in the heretofore known example, it is difficult to reduce leakage fluxes.

Also, in the heretofore known example, a large assembly residual stress remains near the position in which the center bridge 19c exists. Meanwhile, a large tensile stress resulting from a centrifugal force (hereafter, centrifugal stress) is generated in the center bridge 19c when the rotor rotates. With the rotor of the heretofore known embedded permanent magnet type rotating electric machine, as a region in which the assembly residual stress is generated and a region in which the centrifugal stress is generated are close to each other, the strength design of the rotor is difficult. In order to enable a rapid rotation of the rotor, it is necessary to make an arrangement such that no large stress is generated in the range in which tensile residual stress is generated. For this stress relaxation, for example, it is also conceivable to chamfer the center bridge 19c with a large curvature radius. However, this kind of chamfering with a large curvature radius reduces a space in which the magnets are disposed, thus limiting torque. In this way, in the heretofore known example, as there is no effective means to relax stress, there is the problem that the rotation speed of the rotor is restricted, or the size of the magnets is restricted, thus limiting torque.

Also, in general, when irregularities are provided on the outer peripheral surface of the rotor, it is possible to convert the harmonic components of torque generated in the rotor to fundamental components, and thus possible to reduce torque pulsations and increase torque. However, in the case of a rotor having a ring-shaped outermost peripheral region with no hole or depression on the outer side of magnet embedding holes, as in the heretofore known example, assembly residual stress remains in the outermost ring-shaped region. Consequently, in the heretofore known rotor, it is difficult to provide irregularities causing a stress concentration on this kind of outermost peripheral surface of the rotor on which residual stress remains. Therefore, with the heretofore known embedded permanent magnet type rotating electric machine, it is difficult to increase torque by providing irregularities on the outer peripheral surface of the rotor.

SUMMARY OF THE INVENTION

The invention, having been contrived bearing in mind the heretofore described kinds of circumstances, has for its first object to provide an embedded permanent magnet type rotating electric machine which is superior in the strength of a rotor and can be manufactured at low cost. Also, the second object of the invention is to increase torque generated by the rotor without reducing the strength of the rotor.

The invention provides an embedded permanent magnet type motor which has one pole configured of two permanent magnets and has a plurality of poles of permanent magnets embedded in a rotor, the motor being characterized by including a rotor whose magnet embedding holes housing the permanent magnets communicate with a rotor outer periphery.

According to such an invention, as the magnet embedding holes are caused to communicate with the rotor outer periphery, no region in which assembly residual stress remains occurs on the outermost periphery of the rotor. Therefore, it is possible to increase the strength of the rotor when the rotor rotates. Also, as a configuration is such that the magnet embedding holes are caused to communicate with the rotor outer periphery, and no side bridge is even necessary, there is no need either to configure a rotor by combining steel plates without any side bridge and steel plates with the side bridges in order to reduce leakage magnetic fluxes. Consequently, it is possible to manufacture a rotor by stacking only steel plates of one kind or manufacture a rotor from a solid metal blank, and thus possible to reduce manufacturing cost.

In a preferred aspect, the rotor has between adjacent poles a q-axis projection projecting in a direction away from a rotor rotation center axis.

According to the aspect, it is possible to reduce magnetic resistance with respect to q-axis magnetic fluxes and increase reluctance torque, and thus possible to increase the torque of the rotor.

In another preferred aspect, a region, of an inner peripheral wall of each magnet embedding hole, which is on the rotor rotation center axis side stretches out in a direction away from a rotor rotation center toward between the two magnet embedding holes with increasing distance from the center between adjacent poles.

In the aspect, assembly residual stress is hardly generated in a portion in which centrifugal stress is strongly generated. That is, it is in a rotor steel material of a thin portion (a center bridge portion) positioned between the two magnet embedding holes that centrifugal stress is mainly generated, and the magnet embedding holes exist on the same radius as the thin portion. As the thin portion thus exists in a region in which a ring-shaped connection is disconnected on the same radius by the magnet embedding holes, assembly residual stress is hardly generated in the thin portion. As regions in which centrifugal stress is mainly generated and regions in which assembly residual stress is mainly generated can be disposed dispersed in this way, it is possible to increase the rotation speed of the rotor, or it is easy to increase the size of the magnets and increase torque.

In another preferred aspect, the embedded permanent magnet type motor includes a positioning projection, which restrains a movement of the permanent magnet, in a region, of an inner wall of each magnet embedding hole, which is on the outer side in a rotor radial direction as seen from the permanent magnet. An adhesive may be used to assist the fixation of the permanent magnets.

According to the aspect, it is possible, owing to the positioning projections, to fix the position of the permanent magnets in the rotor rotation direction and generate stable magnetic fluxes.

In another preferred aspect, one portion or all of an outer peripheral surface of a rotor steel material on the outer side of the permanent magnets as seen from the rotor rotation center axis has a curvature radius smaller than the distance from the rotor rotation center to a rotor outermost peripheral portion.

According to the aspect, it is possible to reduce the pulsation components of torque generated by the rotor and increase the torque.

DETAILED DESCRIPTION

Figure 1:
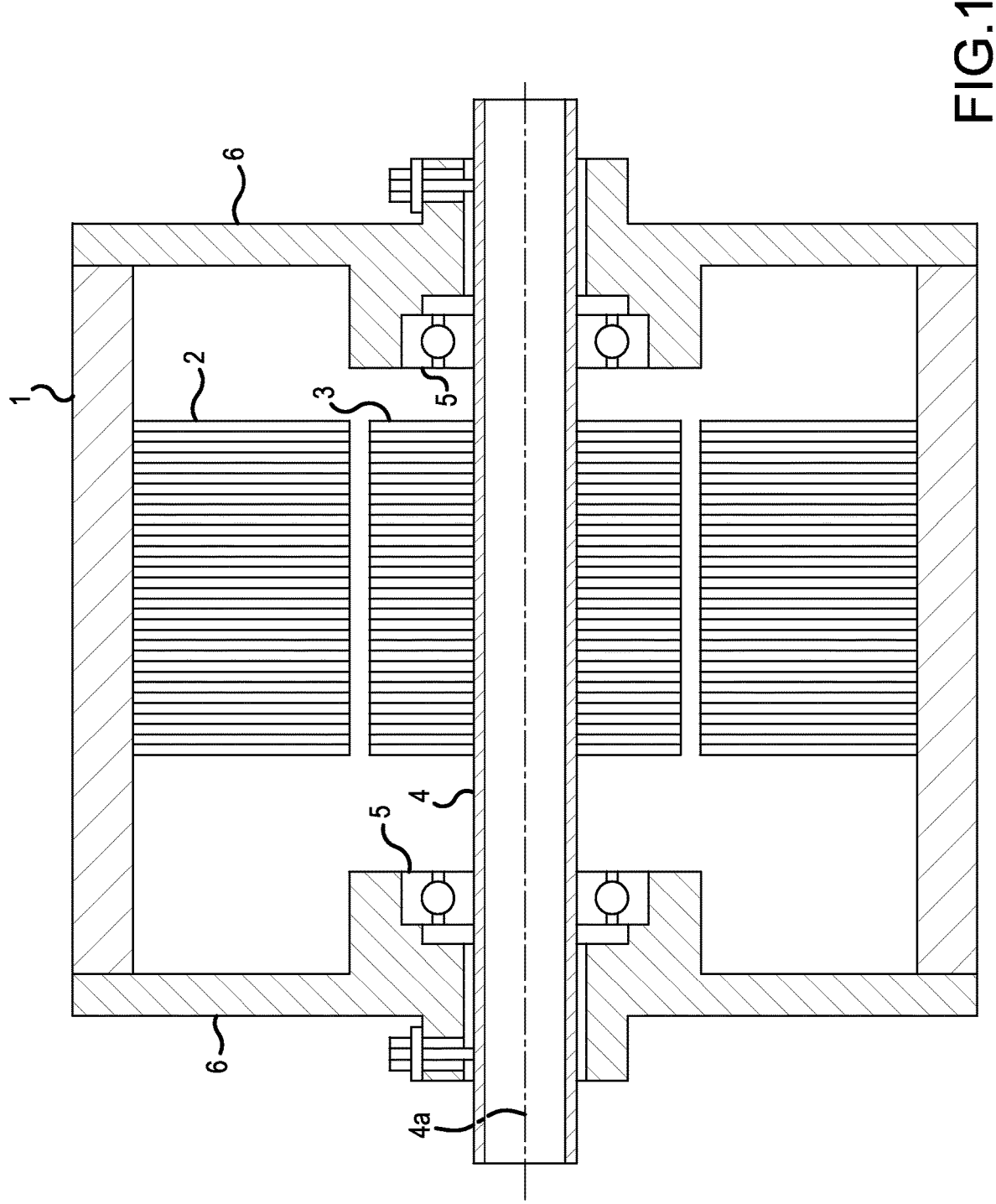
FIG. 1 is a vertical sectional view showing a configuration of an embedded permanent magnet type rotating electric machine which is one embodiment of the invention.

Hereafter, a description will be given, referring to the drawings, of an embodiment of the invention. FIG. 1 is a vertical sectional view showing an overall configuration of an embedded permanent magnet type rotating electric machine which is one embodiment of the invention. In FIG. 1, a frame 1 is a housing which covers the whole of the embedded permanent magnet type rotating electric machine, and is configured from iron, aluminum, stainless, or the like. A hollow cylindrical stationary side core 2 is provided on the inner side of the frame 1. The stationary side core 2 is formed by stacking silicon steel plates. A hole is provided in the stationary side core 2, and a stator winding made of a copper wire or the like is inserted in the hole (the illustration is omitted). A rotor 3 which is a rotary side core is inserted on the inner side of the stationary side core 2 with a predetermined gap sandwiched between the stationary side core 2 and the rotor 3. The rotor 3 is formed by stacking silicon steel plates. There is also a case in which the rotor 3 is configured by cutting a simple iron block. A shaft 4 made of iron or the like passes through the center of the rotor 3. Ideally, the central axis of the shaft 4 is a rotation center axis 4a of the rotor 3. Further, the shaft 4 is supported by shields 6 provided one at each of two front and rear ends of the frame 1, via rolling bearings 5 made of bearing steel or the like.

In this example, the embedded permanent magnet type rotating electric machine is a motor. In the motor, the rotor 3 rotates around the rotation center axis 4a by being energized by rotating magnetic fields created by the stator winding (not shown).

Figure 2:
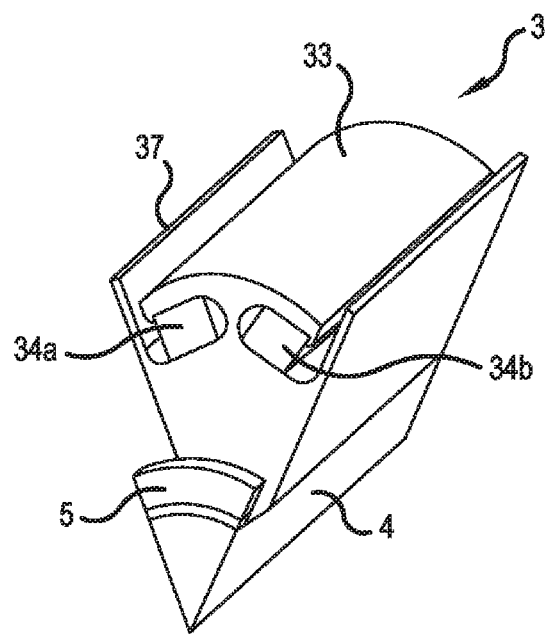
FIG. 2 is a perspective view showing one pole's worth of configuration of a rotor in the embodiment.
Figure 3:
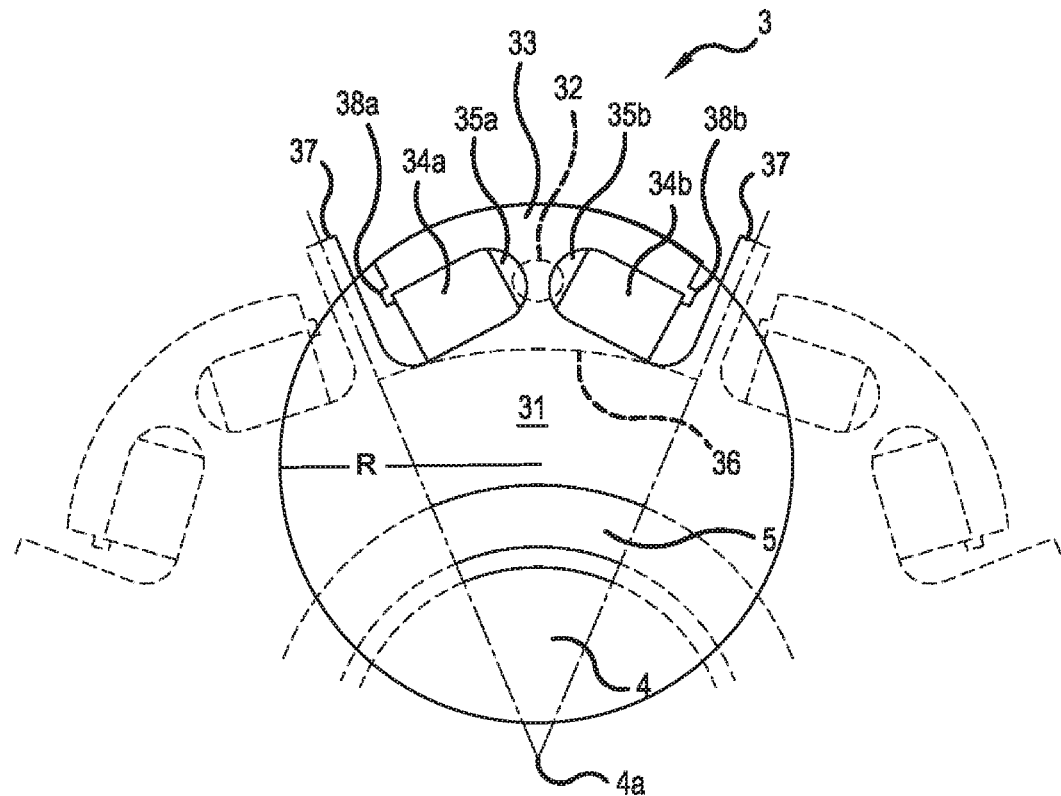
FIG. 3 is a front view showing one pole's worth of configuration of the rotor in the embodiment.
Figure 4A:
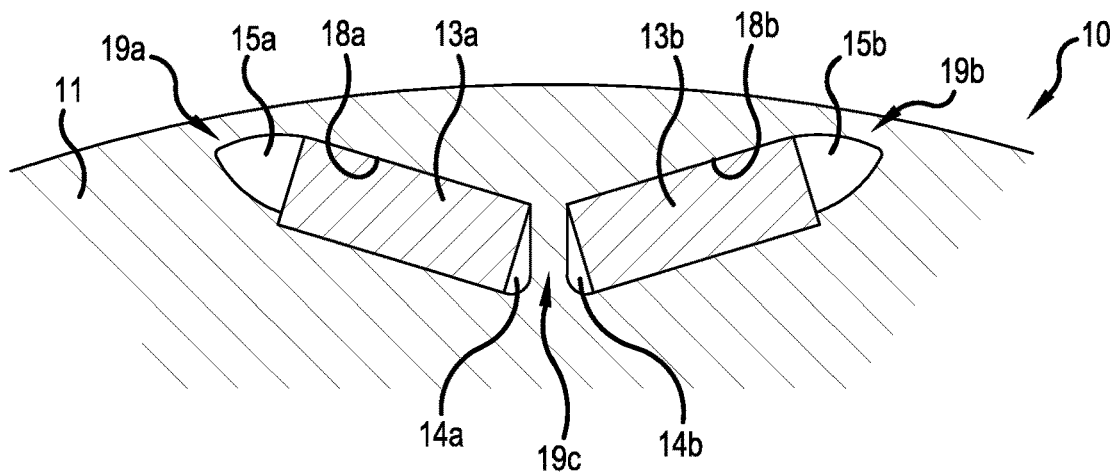
FIGS. 4A-4C are diagrams showing configurations of a rotor of a heretofore known embedded permanent magnet type rotating electric machine.
Figure 4B:
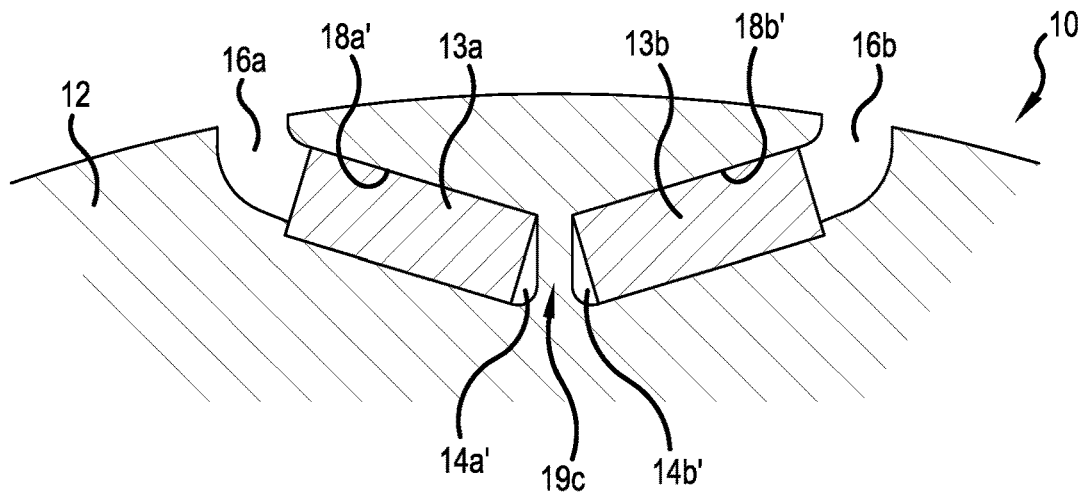
Figure 4C:
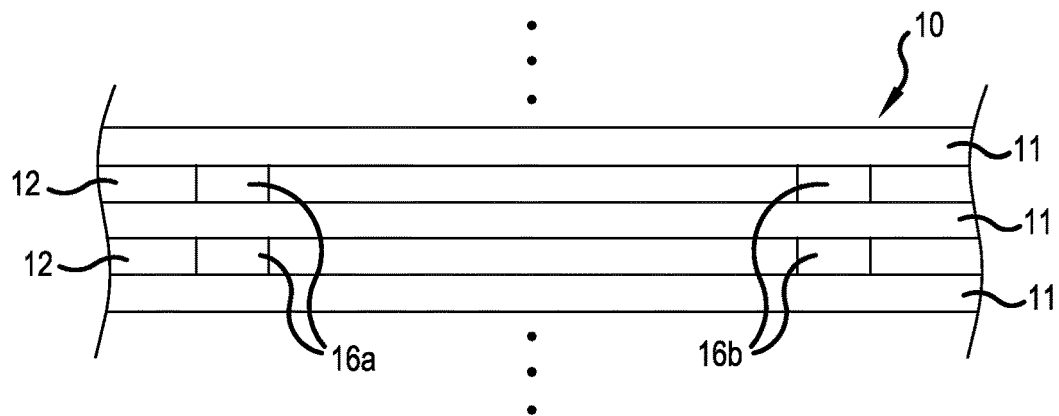

A feature of the embodiment lies in the configuration of the rotor 3. FIG. 2 is a perspective view showing one pole's worth of configuration of the rotor 3 in the embodiment. Also, FIG. 3 is a front view of one pole's worth of configuration of the rotor 3 seen from the direction of the rotation center axis 4a. In FIG. 3, in addition to the one pole's worth of configuration, two poles' worth of configurations adjacent to the one pole's worth of configuration in a rotation direction are shown by the broken lines for easy understanding of the configuration of the rotor 3.

The rotor 3 according to the embodiment can be divided broadly into a core portion 31 closer to the rotation center axis 4a, two permanent magnets 34a and 34b provided for each pole, an outer peripheral edge portion 33 of each pole, made of a rotor steel material, which is on the outer side of the permanent magnets 34a and 34b as seen from the rotation center axis 4a, a center bridge 32 of each pole connecting the core portion 31 and outer peripheral edge portion 33, and q-axis projections 37 each provided between two adjacent poles.

One pole's worth of the outer peripheral edge portion 33 has a substantially arc-like section, and connects with the core portion 31, via the center bridge 32, in the center in the rotor rotation direction. The outer peripheral surface of the outer peripheral edge portion 33 has a curvature radius R smaller than the distance from the rotation center axis 4a to a rotor outermost peripheral portion. This is because a magnetic field calculation by the present inventors reveals that the harmonic components of torque are reduced by forming the outer peripheral edge portion 33 in this kind of shape, and that the fundamental components of torque generated in the rotor 3 increase by the reduced amount. In this way, the curvature radius R of one portion of the outer peripheral edge portion 33, rather than all of the outer peripheral edge portion 33, may be made smaller than the distance from the rotation center axis 4a to the rotor outermost peripheral portion.

A magnet embedding hole 35a in which to hold the permanent magnet 34a and the magnet embedding hole 35b in which to hold a permanent magnet 34b are provided on the inner side of the outer peripheral edge portion 33. The magnet embedding holes 35a and 35b are enclosed from three directions by the outer peripheral edge portion 33, center bridge 32, and core portion 31. The outer peripheral edge portion 33 supports the permanent magnets 34a and 34b to the rotation center axis 4a side against a centrifugal force acting on the permanent magnets 34a and 34b when the rotor 3 rotates. The outer peripheral edge portions 33 corresponding one to each pole are disposed in the rotor rotation direction with a gap sandwiched between one outer peripheral edge portion 33 and an adjacent one. The gap between two adjacent outer peripheral edge portions 33 is positioned in the center between the poles. The magnet embedding holes 35a and 35b communicate with a rotor outer periphery via the gap between the two adjacent outer peripheral edge portions 33.

The magnet embedding holes 35a and 35b are disposed in an inverted V shape. Further, a region (the core portion 31) on the rotation center axis 4a side of the inner peripheral wall of each magnet embedding hole 35a and 35b inclines in a direction away from the rotation center axis 4a toward between the two magnet embedding holes (that is, toward the center bridge 32) with increasing distance from the center between adjacent poles. Therefore, the center bridge 32 is in a position spaced outward in a rotor radial direction from an inscribed circle 36 of all the magnet embedding holes 35a and 35b of the rotor 3.

The q-axis projection 37, passing through the gap between two adjacent outer peripheral edge portions 33, projects in a centrifugal direction (a direction away from the rotation center axis 4a) from the central position between the poles of the adjacent core portions 31. The magnet embedding holes 35a and 35b are provided respectively with positioning projections 38a and 38b which restrain the permanent magnets 34a and 34b from moving to the respective q-axis projection 37 sides. The positioning projections 38a and 38b project toward the rotation center axis 4a from regions, of the inner walls of the magnet embedding holes 35a and 35b, which are on the outer side in the rotor radial direction as seen from the permanent magnets 34a and 34b, that is, from the q-axis projection 37 side end portions on the inner side of the outer peripheral edge portion 33. The permanent magnets 34a and 34b are fixed in the magnet embedding holes 35a and 35b while being pressed against the positioning projections 38 and 38b. At this time, an adhesive is used to assist the fixation of the permanent magnets 34a and 34b to the magnet embedding holes 35a and 35b. The above is the configuration of the rotor 3 in the embodiment.

The rotor 3 in the embodiment has a configuration wherein the magnet embedding holes 35a and 35b communicate with the rotor outer periphery. Hereafter, a description will be given of reasons for adopting the configuration.

The method of assembling a shaft and a rotor steel material using an interference fit such as a shrink fit is commonly used in manufacturing a motor. In this interference fit process, circumferential tensile stress remains in the rotor steel material. The residual stress generated when assembling the rotor still remains even while the rotor is rotating rapidly. After the present inventors have made a calculation using a finite element method, it is confirmed that the residual stress is hardly generated on a circumference having the same radius as a portion of the rotor steel material having a hole, a depression, or the like (that is, no stress remains unless in portions, having no hole or depression, which connect in a ring shape).

Meanwhile, when the rotor rotates, in particular, when the rotor rotates rapidly, an enormous centrifugal force is generated in each portion of the rotor. At this time, when the rotor has a center bridge and side bridges, as in a heretofore known example, a large centrifugal force is generated in the center bridge and side bridges. In this case, tensile stress acts on the center bridge, while shear stress is generated in the side bridges, due to the centrifugal force generated by the rotation of the rotor. Therefore, in order to prevent damage to the rotor due to the rapid rotation, it is necessary to sufficiently increase the strength of the side bridges rather than that of the center bridge, and this point makes the strength design of the rotor difficult.

Also, in the heretofore known example, in order to achieve both the object of reducing leakage fluxes and the object of securing the strength of the rotor, the rotor is configured by combining rotor steal plates with the side bridges and rotor steal plates without the side bridges. Therefore, the rotor of the heretofore known example has the problem of an increase in manufacturing cost or the like.

Therefore, as the configuration of the rotor, the embodiment adopts a configuration wherein the magnet embedding holes 35a and 35b communicate with the rotor outer periphery, that is, a configuration wherein the side bridges in the heretofore known example do not exist. According to the embodiment, as the rotor has no side bridge on the outermost periphery, no assembly residual stress remains on the outermost periphery of the rotor. Centrifugal stress generated by the centrifugal force when the rotor rotates concentrates on the center bridge, but the centrifugal stress acting on the center bridge is tensile stress, meaning that it is easy to respond so as for the center bridge not to sustain damage by adjusting the width of the center bridge or the like. Moreover, the rotor configuration wherein the magnet embedding holes 35a and 35b communicate with the rotor outer periphery produces great advantages to be described hereafter.

Firstly, unlike the heretofore known example, the rotor 3 in the embodiment has the same sectional shape when sectioned by any plane perpendicular to the rotor rotation axis. Therefore, the rotor 3 in the embodiment has manufacturing advantages. That is, the rotor 3 according to the embodiment can be cut out of a solid metal blank. Also, even when forming the rotor 3 in the embodiment using stacked steel plates, there is no need to prepare a plurality of kinds of steel plates differing in hole shape, and only steel plates of one kind only have to be prepared. Consequently, it is possible to overwhelmingly hold down the cost of steel plates from the aspect of the investment expenses of a punch die for forming steel plates, and also from the aspect of a parts control, as well as from the aspect of a strength and magnetic field design.

Also, the rotor 3 in the embodiment has less magnetic flux leakage paths than in the heretofore known example having the side bridges. Therefore, it is easy for the magnetic fluxes of the magnets to link with the winding, and this contributes to an increase in torque.

Furthermore, the rotor 3 according to the embodiment has an advantage from the aspect of cooling too. That is, the rotor 3 is well ventilated in the rotation axial direction and thus favorable for cooling, especially, for cooling the magnets. Consequently, by employing the rotor 3 according to the embodiment, it is possible to loosen the regulations on motor capacity.

Furthermore, when all the magnet embedding holes 35a and 35b are caused to communicate with the rotor outer periphery, the permanent magnets 34a and 34b are supported at a uniform stress over the whole length by the outer peripheral edge portions 33. Therefore, stress is difficult to generate inside the permanent magnets 34a and 34b, and it is thus possible to protect the permanent magnets 34a and 34b against damage.

As another feature of the embodiment, there is the q-axis projection 37. The q-axis projection 37 can produce a strong reluctance torque, thus contributing to an increase in the torque generated in the rotor.

Furthermore, as another feature of the embodiment, there is the shape of the outer peripheral edge portion 33. When irregularities are provided on the outer peripheral surface of the rotor, the harmonic components of torque generated in the rotor can be converted to fundamental components, and it is thus possible to reduce torque pulsations and increase torque. Meanwhile, it is widely known that when a force is applied to an irregular portion, a high stress is locally generated by a phenomenon called a stress concentration. In the case of the rotor whose magnet embedding holes do not communicate with the rotor outer periphery and whose outermost periphery continues in a ring shape, as in the heretofore known example, assembly residual stress remains in a ring-shaped region in the vicinity of the rotor outer peripheral surface. Therefore, in the rotor of the heretofore known example, it is difficult to provide irregularities causing the stress concentration on this kind of outermost peripheral surface of the rotor on which the residual stress remains. However, in the embodiment, as the magnet embedding holes 35a and 35b are caused to communicate with the rotor outer periphery, no residual stress remains in the outer peripheral edge portion 33 which is the outermost peripheral region of the rotor 3. Consequently, in the embodiment, in order to increase torque, it is easy to provide irregularities on the outer peripheral surface of the outer peripheral edge portion 33 which is the outermost peripheral region of the rotor 3. Therefore, in the embodiment, the curvature radius R of the outer peripheral surface of the outer peripheral edge portion 33 which is on the outer side of the permanent magnets as seen from the rotor rotation center is made smaller than the distance from the rotor rotation center to the rotor outermost peripheral portion. In this way, in the embodiment, it is possible to reduce torque pulsations generated in the rotor 3 and increase torque without increasing initiation stress.

Also, as a feature of the embodiment, there are the magnet embedding holes 35a and 35b disposed in an inverted V shape. Advantages which can be obtained from the feature will be described as follows.

Firstly, in the process of interference fitting the shaft 4 into the rotor 3, circumferential tensile stress remains in the rotor steel material. This residual stress is hardly generated on the circumference having the same radius as the magnet embedding holes 35a and 35b. Consequently, in the rotor 3 in the embodiment, little assembly residual stress remains on the outer side in the rotor radial direction of the inscribed circle 36 of the magnet embedding holes 35a and 35b. Meanwhile, when the rotor 3 rotates, tensile stress resulting from a centrifugal force (a centrifugal stress) is generated in the center bridge 32. When the magnet embedding holes 35a and 35b are disposed in an inverted V shape, the position of the center bridge 32 is away outward in the rotor radial direction from inside the inscribed circle 36 inside which residual stress is mainly generated. In this way, according to the embodiment, the center bridge 32 on which centrifugal stress concentrates when the rotor 3 rotates is away from inside the inscribed circle 36 inside which residual stress resulting from an interference fitting is mainly generated, meaning that it is possible to increase the strength of the center bridge 32 when the rotor 3 rotates.

Also, in the embodiment, the positioning projections 38a and 38b are provided on the outer peripheral edge portion 33 which is on the outer side in the radial direction as seen from the permanent magnets 34a and 34b. Consequently, the permanent magnets 34a and 34b are fixed by being pressed against the positioning projections 38a and 38b, and it is thereby possible to prevent the imbalance between the centrifugal forces generated in the two permanent magnets 34a and 34b which form one pole, and prevent the imbalance between the magnetic flux distributions generated by the individual permanent magnets.

As in the heretofore known example, there is also the method of providing the positioning projections on the rotor steel material on the inner side in the radial direction as seen from the permanent magnets, but there is a problem in carrying out the method by disposing the magnet embedding holes 35a and 35b in an inverted V shape. This is because the positioning projections are provided close to a region in which assembly residual stress is generated. When the positioning projections are provided, a depression is also formed at the same time. Originally, a stress concentration easily occurs in the depression. In this case, in the event that the depressed portion can be chamfered with the chamfer radius increased, it is possible to relax the stress concentration to some extent, but the chamfer radius enabling a sufficient relaxation of stress, often becoming equal to or more than the thickness of the magnets, is of no use for positioning. Therefore, it is not preferable that the positioning projections are provided on the rotor steel material on the inner side in the radial direction as seen from the permanent magnets, as in the heretofore known example, because this arrangement reduces the strength of the positioning projections against assembly residual stress.

As in the above, according to the embodiment, it is possible to realize an embedded permanent magnet type rotating electric machine which is superior in the strength of the rotor, can be manufactured at low cost, and can obtain a large torque.

A description has heretofore been given of one embodiment of the invention, but another embodiment is conceivable for the invention. For example, in the heretofore described embodiment, the invention is applied to a motor, but naturally, the invention can also be applied to a generator.

What is claimed is:

1. An embedded permanent magnet type rotating electric machine, comprising: a rotor having a plurality of poles with a q-axis projection disposed between adjacent poles of the plurality of poles, the q-axis projection projecting in a direction away from a rotor rotation center axis, wherein: each of the plurality of poles includes a permanent magnet inserted in each of two magnet embedding holes, each of the two magnet embedding holes having a first side that communicates with an outer periphery of the rotor and that faces the q-axis projection projecting in the direction away from the rotor rotation center axis, a center bridge is disposed between a second side of each of the two magnet embedding holes, the two magnet embedding holes each having the first side that communicates with the outer periphery of the rotor and that faces the q-axis projection projecting in the direction away from the rotor rotation center axis are disposed in an inverted V shape with a central portion of the V pointing away from the rotor rotation center axis such that the center bridge is positioned on an outer side in a rotor radial direction of an inscribed circle of all the magnet embedding holes, and one pole's worth of an outer peripheral surface of an outer peripheral edge portion of the rotor has a first curvature radius, and outer peripheral surfaces of q-axis projections sandwiching the one pole have a second curvature radius greater than the first curvature radius.

2. The embedded permanent magnet type rotating electric machine according to claim 1, wherein
fixation of the permanent magnets is assisted by an adhesive.

3. The embedded permanent magnet type rotating electric machine according to claim 1, further comprising:
positioning projections respectively disposed at the first sides of the two magnet embedding holes and configured to restrain movement of the permanent magnets in the two magnet embedding holes.

4. The embedded permanent magnet type rotating electric machine according to claim 3, wherein
fixation of the permanent magnets is assisted by an adhesive.

5. The embedded permanent magnet type rotating electric machine according to claim 1, wherein one portion or all of an outer peripheral surface of a rotor steel material on an outer side of the permanent magnets as seen from the rotor rotation center has a curvature radius smaller than the distance from the rotor rotation center axis to a rotor outermost peripheral portion.

6. The embedded permanent magnet type rotating electric machine according to claim 5, wherein
fixation of the permanent magnets is assisted by an adhesive.

7. The embedded permanent magnet type rotating electric machine according to claim 5, further comprising:
positioning projections respectively disposed at the first sides of the two magnet embedding holes and configured to restrain movement of the permanent magnets in the two magnet embedding holes.

8. The embedded permanent magnet type rotating electric machine according to claim 7, wherein
fixation of the permanent magnets is assisted by an adhesive.

9. An embedded permanent magnet type rotating electric machine, comprising: a rotor having a plurality of poles with a q-axis projection disposed between adjacent poles of the plurality of poles, the q-axis projection projecting in a direction away from a rotor rotation center axis, wherein: each of the plurality of poles includes a permanent magnet inserted in each of two magnet embedding holes, each of the two magnet embedding holes having a first side that communicates with an outer periphery of the rotor and that faces the q-axis projection projecting in the direction away from the rotor rotation center axis, a center bridge is disposed between a second side of each of the two magnet embedding holes, and the two magnet embedding holes each having the first side that communicates with the outer periphery of the rotor and that faces the q-axis projection projecting in the direction away from the rotor rotation center axis are disposed in an inverted V shape with a central portion of the V pointing away from the rotor rotation center axis such that the center bridge is positioned on an outer side in a rotor radial direction of an inscribed circle of all the magnet embedding holes; and positioning projections respectively disposed at the first sides of the two magnet embedding holes and configured to restrain movement of the permanent magnets in the two magnet embedding holes, wherein one portion or all of an outer peripheral surface of a rotor steel material on an outer side of the permanent magnets as seen from the rotor rotation center has a curvature radius smaller than a distance from the rotor rotation center axis to a rotor outermost peripheral portion.

* * * * *